Aug. 30, 1960   M. K. STOLIER   2,950,664
FILM TREATMENT APPLICATOR
Filed May 23, 1958
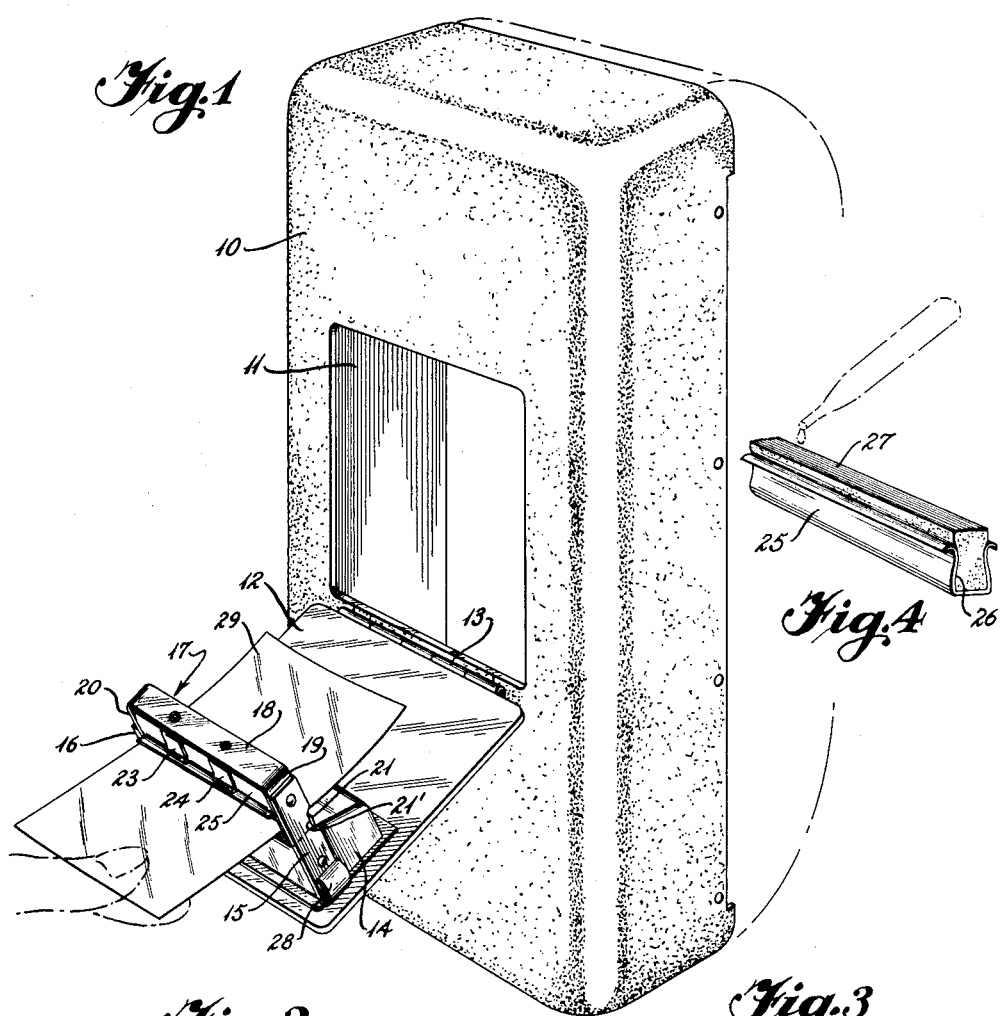
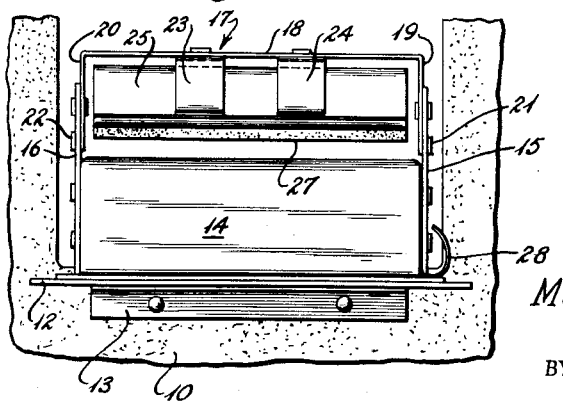
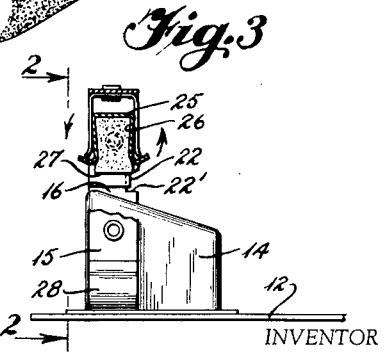
INVENTOR
Michael Kenneth Stolier
BY
ATTORNEYS

United States Patent Office 2,950,664
Patented Aug. 30, 1960

2,950,664
FILM TREATMENT APPLICATOR
Michael Kenneth Stolier, 20 Grenada Place, Massapequa, N.Y.,
Filed May 23, 1958, Ser. No. 737,448
6 Claims. (Cl. 95—13)

This invention relates to improvements in photographic equipment. More particularly it relates to an improved device for applying a treatment such as a preservative to a positive film print of the type which is exposed, developed and printed in consecutive operations within a camera such as the "Polaroid Land Camera."

Heretofore, to apply a preservative to a positive print which has been exposed, developed and printed in a camera it has been necessary to use a dauber or similar means to assure thorough application of the preservative. This has proved unsatisfactory as it is difficult to apply the preservative uniformly to the surface of the print due to variations in the degree of saturation of the dauber and varying pressures when the preservative is manually applied.

Therefore, it is a primary object of this invention to provide a treatment applicator assembly which insures uniform application and distribution of the preservative to impart permanence to film print.

Another object of this invention is to provide a preservative applicator which may be incorporated in the case of a camera or in a camera carrying case of suitable design and size and thereby eliminate the necessity of providing separate apparatus for imparting greater permanence to the film print.

A further object of this invention is to provide a preservative applicator for imparting permanence to a film print, quickly, easily and inexpensively.

A still further object is to overcome the curling of the film print which normally occurs if the present invention is not employed.

In attaining these objects, one of the features of the invention is the compactness and simplicity of the device. Indeed, the device in which the present invention is embodied is so compact that it can be incorporated in or attached to a camera case, or a camera cover or camera and accessory case without encumbering or interfering with the normal use of either the camera, the case or the carrying case. The embodiment of the invention described in detail hereinafter is an assembly pivotally hinged at one end thereof to a camera case. In this embodiment of the invention the support constitutes a hatch cover hingedly mounted on said camera case and adapted to be in registry with, and in fact, to overlie an opening in the camera case. The assembly is so compact and is so positioned on said case that it clears the opening in the case and is confined entirely within the camera case when the hatch cover is in closed position. The hatch cover is adapted to be swung about its hinge as an axis through 180° to rest with the back or normally outer surface thereof on the outer surface of the camera case, the assembly being mounted on the normally inner surface of said cover and therefore uppermost and outermost when the device is brought into operative position.

The film treatment assembly includes a block-like film support rigidly mounted on the hatch cover and attached thereto, a pair of vertically disposed film guides having a resilient applicator frame rotatably connected thereto. The applicator frame comprises a U-shaped resilient strip, the respective sides of which are pivotally secured to the upper portion of the respective film guides. At the free ends of said U-shaped strip are lugs which are adapted to impinge upon the film guides to limit the extent and direction of rotation of the frame in the assembly. The U-shaped strip of the applicator frame is also provided, intermediate the ends thereof, with a pair of outwardly extending clamps between which is engaged a removable squeegee-type applicator having a channel-shaped, fluid-impervious holder for an absorbent swab. The swab in the holder is moistened or saturated with the appropriate preservative and is evenly applied to the film as the print is drawn between the film guides and between the support and said applicator. Manual pressure is applied to the resilient strip with one hand to bring the applicator into uniform contact with the film as it is drawn through the device with the other hand. The squeegee-type applicator is not only rotatable in the applicator frame so as to facilitate saturation thereof but also is detachable so that it may be quickly and easily refurbished with the preservative fluid, or to be replaced.

To retain the hatch cover in closed position over the hatch opening, a catch is provided at the base of one or both of the vertically disposed film guides. It will be apparent to those skilled in the art that this catch may be a separately mounted element, or it may be a continuation of the film guide and suitably formed and tempered to perform its function as a catch.

These and other objects of the invention will become apparent to those skilled in the art from the following specification and drawings wherein:

Fig. 1 is a perspective view of the device of the present invention in one operative position;

Fig. 2 is a front elevational view of the device of the present invention as viewed from line 2—2 of Fig. 3;

Fig. 3 is a side elevational view partly in section of the device of the present invention as viewed from line 3—3 of Fig. 2; and Fig. 4 is a perspective view of the squeegee-type applicator removed from the applicator frame and showing one method of saturating the absorbent swab.

A conventional camera of the type which exposes, develops and makes positive prints in consecutive operations within the camera is equipped with a camera case cover 10 secured by hinges or otherwise attached to a camera carrying case (not shown). The construction of the case is such that the camera may, if desired, be removed from the carrying case, and the case and cover may be pivotally manipulated or separated one from the other in order that the cover and the case may lie on a common longitudinal plane or surface with the normally outer surface of the cover uppermost.

A generally square opening or hatch 11 is provided in cover 10 and is so located that a hatch cover 12, also of generally square contour, is in registry with and overlies the entire opening. The hatch cover 12 is pivotally attached to cover 10 by hinge 13.

Mounted on the inner side of hatch cover 12 is a film print support 14 having a pair of vertically disposed film guides 15 and 16, respectively secured to opposite sides of said support 14. Pivotally and rotatably secured to the upper portion of the respective film guides 15 and 16 is an applicator frame 17 which includes a U-shaped resilient strip 18 which is adjacent and rotatable in relation to the film print support 14. Extending from the arms 19 and 20, respectively, of the U-shaped resilient strip 18 and at the free end thereof are lugs 21 and 22 which limit the extent and direction of the rotation of the applicator frame in relation to the film print support. The lugs 21 and 22 engage in notches 21' and 22', respectively, in the respective film guides 15 and 16.

Intermediate the ends of the U-shaped strip 18 is a pair of laterally spaced, downwardly extending clamps 23 and 24 which engage a detachable squeegee-type applicator assembly 25.

As seen in Fig. 4, the detachable applicator comprises a channel-shaped holder 26 and an absorbent swab 27 which is moistened or saturated with the preservative, for example, by the use of a fluid dropper or the like.

The squeegee-type applicator may be easily removed from the frame by rotating the frame about its axis to move the swab 27 away from the film support 14 until the applicator 25 is in a position to be disengaged from the clamps 23 and 24. Although it is not necessary to remove the applicator 25 if it is only desired to apply the preservative fluid to the swab 27, the entire applicator assembly 25 may be removed for purposes of replacement of the swab.

The hatch cover 12 may be retained in closed position over the opening 11 of the camera case cover 10 by means of a catch 28 which is formed as an integral part of the assembly at the base of one or both of the vertically disposed film guides 15 or 16. The catch 28 engages the inner edge of the hatch opening 11 when the cover 10 is in closed position but may be easily disengaged by lifting one edge of the cover 10. As previously stated, catch 28 may be a separate element mounted at the base of the film guide or, as illustrated herein, it may be integral therewith and an extension thereof.

In the operation of the device embodying the present invention, a film is exposed, developed and printed within the camera in the usual manner. When it is desired to apply the treatment or preserving fluid to the film, the film print 29 is removed from the camera in the usual manner. The hatch cover 12 is opened by releasing catch 28 as described hereinbefore and is swung about its hinge 13 through 180° to lie on the normally outer surface of the cover 10. However, it is not necessary for the effective operation of this device that the hatch cover 10 lie on a flat surface, as any position suitable to the user of the device may be employed. It may even be attached to the camera itself, if desired.

With the hatch cover 12 open and the film print support 14 rendered accessible to the operator, the positive film print 29 from the camera is inserted between the support 14 and the swab 27, and between the film guides 15 and 16 as shown in Fig. 1. It is to be noted that the surface of the support 14 is inclined to the horizontal by an angle of approximately 30° to aid in the manipulation of the positive film print.

The positive film print 29 is drawn through the space between the film support 14 and the applicator swab 27 with one hand while the resilient U-shaped strip 18 is pressed down with the other hand insuring uniform contact and pressure of the swab 27 on the positive film print 29. Due to the lugs 21 impinging on the film guides, the applicator 25 will remain in position as the film print is being drawn through and will not rotate with the motion of the print.

Although the applicator frame has been described as resilient, it may be rigid and the clearance between the base of the film print guide block and the squeegee-type applicator will be such as to insure contact of the preserving fluid with the film print. In that case it will only be necessary to insert the film print between the guide block and applicator and pull it through without the necessity of using pressure on the applicator frame. However, the preferred embodiment of the invention contemplates the use of a resilient applicator frame to insure that the film print is well and evenly coated.

It has been discovered that the normal tendency of the film to curl upon drying may be overcome by pulling downwardly on the film as it is drawn through the applicator frame, thereby imparting to the film a curl opposite that normally occurring. Thus when the print dries, the film becomes and remains flat.

Although this applicator has been shown in connection with a case attached to the camera itself, it will be apparent to those skilled in the art, and it is contemplated by the inventor that such a device may either be incorporated in any type of camera case, regardless of size or design, or may simply be attached thereto by suitable brackets or other retaining means.

The foregoing is one embodiment of the invention and it will be apparent to those skilled in the art that various changes and modifications may be made therein without departing from the scope of the invention.

What I claim is:

1. For use in combination with a camera which exposes, develops and produces positive prints from a film in consecutive operations; a vase, a cover pivotally mounted on the case in registry with an opening therein; a film treatment applicator assembly mounted on the inner side of said cover including a film support; a pair of vertically disposed parallel film guides secured to said film support; an inverted U-shaped rotatable frame having the opposite ends thereof attached to the respective film guides; and means detachably secured to said U-shaped frame applicator for applying a treatment to a positive film print passing between said film guides and between said film support and said detachable applying means.

2. For use in combination with a camera which exposes, develops and produces positive prints from a film in consecutive operations; a case, a cover hingedly mounted on the case in registry with an opening in the case and adapted to be swung outwardly of said camera to 180° about its hinge as an axis whereby the normally outer surface of said cover rests on the normally outer surface of said case; a film treatment applicator assembly mounted on the normally inner side of said cover substantially perpendicular thereto and adapted to pass through said opening in said case to be confined entirely within the case when said cover is in closed position, said assembly including a film support; a pair of vertically disposed parallel film guides secured to said film support; an inverted U-shaped applicator frame pivotally and rotatably secured by the respective ends thereof to the upper portion of the respective parallel film guides; and means detachably mounted on said U-shaped applicator frame for applying a treatment to a positive film print passing between said film guide and between said film support and said treatment applying means.

3. For use in combination with a camera as set forth in claim 2 wherein the U-shaped applicator frame includes means to limit the extent and direction of rotation of said applicator frame.

4. For use in combination with a camera as set forth in claim 2 wherein the U-shaped applicator frame is resilient and is provided with clamp means extending outwardly from said U-shaped applicator frame intermediate the ends thereof and a removable absorbent applicator engaged within said clamp, said applicator being adapted to be moved toward said film support in response to pressure applied to said resilient applicator frame.

5. For use in combination with a camera which exposes, develops and produces positive prints from a film in consecutive operations; a case, a cover mounted on said case in registry with an opening therein, a block fixedly mounted on the inner side of said cover, said blocking having a film guide surface of a width at least equal to the width of a film print produced by said camera, said surface terminating at an abrupt edge, a pair of guides projecting from said block on opposite sides of said guide surface, a resilient film treatment applicator support mounted upon and extending between said guides in spaced relationship to said film guide surface, and a film treatment applicator removably mounted in said support for applying a coating to a film print passed between said film guide surface and said support.

6. For use in combination with a camera which exposes, develops and produces positive prints from a film in consecutive steps, and a squeegee-type applicator for applying a treatment coating to a positive print produced by said camera; a case, a cover pivotally supported upon said case in registry with an opening therein, means on the inner side of said cover defining a print support surface having a width equal to or greater than the width of a print produced by said camera, vertically disposed parallel print guides projecting from opposite sides of said print support surface, support means on said guides for supporting said applicator therebetween for pivotal movement about an axis extending transversely between said guides in spaced relationship to said print support surface, stop means on said support means for limiting pivotal movement of said support means in one direction to a position wherein said applicator is operable to apply a treatment coating to a positive print drawn between said applicator and said support surface in a direction tending to pivot said applicator in said one direction, said stop means permitting free pivotal movement of said applicator in the direction opposite said one direction to swing said applicator away from said surface to facilitate insertion of a print to be treated between said applicator and said support.

References Cited in the file of this patent
UNITED STATES PATENTS

| | | |
|---|---|---|
| 1,568,245 | Ruze | Jan. 5, 1926 |
| 2,348,067 | Hoitt | May 2, 1944 |
| 2,543,180 | Land | Feb. 27, 1951 |
| 2,714,844 | Heidecke | Aug. 9, 1955 |